Tiffany & Heermance,
Steam-Boiler Furnace,
No. 1,174. Reissued Apr. 16, 1861.
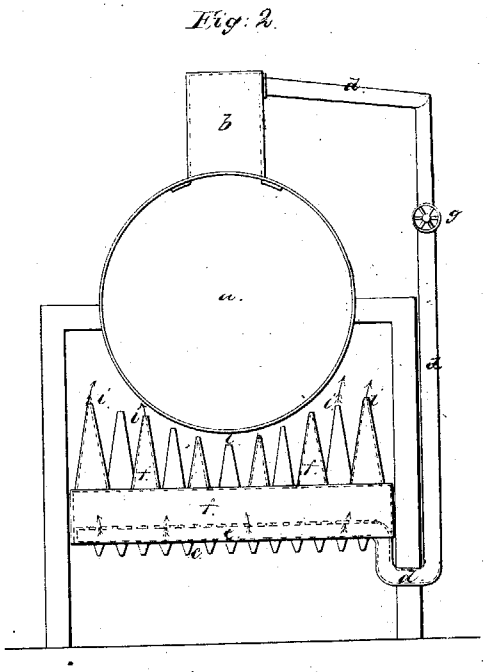
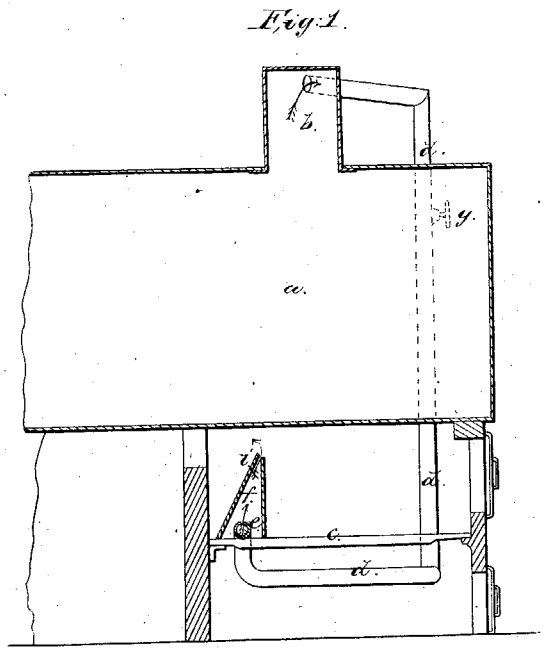
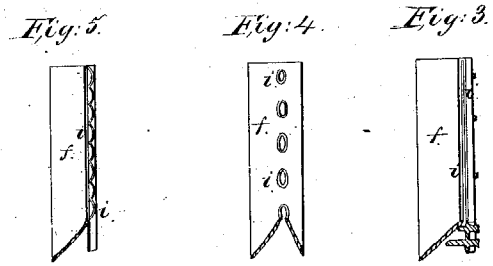
Witnesses:
Lemuel W. Serrell
Chas. H. Smith
Inventor:
Joseph C. Tiffany
Garret G. Heermance
N. PETERS, PHOTO-LITHOGRAPHER, WASHINGTON, D. C.

UNITED STATES PATENT OFFICE.

JOSEPH C. TIFFANY, OF NEW YORK, ASSIGNEE OF HIMSELF, AND GARET G. HEERMANCE, OF HUDSON, N. Y.

IMPROVEMENT IN MEANS OF PROMOTING COMBUSTION IN THE FURNACES OF STEAM-BOILERS.

Specification forming part of Letters Patent No. 934, dated April 2, 1861; Reissue No. 1,174, dated April 16, 1861.

*To all whom it may concern:*

Be it known that JOS. C. TIFFANY, of the city, county, and State of New York, and GARET G. HEERMANCE, of Hudson, in the county of Columbia and State of New York, did invent a certain new and useful Improvement in the Furnaces of Steam-Boilers and in the Means of Promoting Combustion in Furnaces; and the following is a full, clear, and exact description of said invention, reference being had to the annexed drawings, making part of this specification, wherein—

Figure 1 is a vertical section of a boiler fitted with said invention, and Fig. 2 represents a cross-section of a furnace.

Similar marks of reference denote the same parts.

It has long been known that the introduction of air into a furnace, either through or near the bridge-wall, would aid in consuming the gases liberated from coal or other fuel in the process of combustion, and also that steam introduced in moderate quantities into the combustion-chamber, either by injection pipes or tubes or by being liberated from wet fuel thrown into the furnaces, would also facilitate the combustion of the fuel and make it more perfect. The methods which have heretofore been devised for perfecting combustion by these means have been found to possess many practical disadvantages, and have failed to become generally used. It has sometimes been attempted to throw a jet of steam into the combustion-chamber over or upon the fuel through pipes more or less exposed to the direct action of the fire, and some have introduced steam and air through separate pipes in a similar manner, and to cause them to unite in the combustion-chamber at the orifices of the pipes. In all these cases the pipes have been soon destroyed by the heat of the fire or clogged and choked by the ashes and cinders, so as to become useless; and when air and steam have been injected the intermixture has been effected, or sought to be effected, in the combustion-chamber, and the decomposition of steam effected by contact with the incandescent fuel.

The nature of the invention of the said TIFFANY and HEERMANCE is such as to provide practicable, economical, and effectual means of mingling the air and steam, then introducing them into the combustion-chamber at that part of it where this will produce the best effect on combustion, and to render the combustion practically perfect and in such place and manner that its effect in transmitting heat to the water in the boilers shall also be the greatest.

It consists in combining with the furnace or combustion chamber a heated chamber through which the air passes into the combustion-chamber above the coal or other fuel, and in such manner as not to come in contact with it, covering and protecting a pipe with suitable perforations within said chamber for the purpose of supplying a regulated amount of steam. This heated chamber may be placed in any part of the furnace; but the best result has been found to be obtained by placing it at or near the bridge-wall, having one side of the chamber formed by the bridge-wall and the other side of the chamber by a plate of iron, protected, by fire-clay or other proper and well-known covering, from the effect of the fire in the furnace. By placing the chamber at the bridge-wall the openings may be so arranged as to admit the mingled steam and air into the combustion chamber, near the entrance of the flue, and bring the flame developed by the more perfect combustion in direct contact with the surface of the boiler and flues. This heated chamber, constructed as described, protects the steam-pipe from injury by contact with the fire, and also forms a flue in which the air and the steam or the gases liberated from the steam as it comes in contact with the red-hot iron plate upon the side of the chamber are perfectly commingled, and which are forced with an increased draft into the combustion-chamber, and are thoroughly diffused through the combustible gases, fragments of fuel, or cinders, which would otherwise pass off unconsumed into the chimney. The steam and air unite in the heated chamber and pass off through suitable openings between the iron plates, so as to combine with the products of imperfect combustion as they pass off from the incandescent flame.

The annexed drawings represent a boiler, *a*, and steam-dome *b*, and grate-bars, as usual. *f* is a hollow box forming a heated chamber, supplied from the ash-pit or blower with air, and *d* is a pipe with a regulating-cock, *g*, for the admission of steam through the perforated pipe *e* within the chamber *f*. This chamber is located, for the reasons already given, at the rear end of the furnace. *i* is an opening through which the air and steam or gases escape into the combustion-chamber. The best results have been obtained by arranging the perforations in the steam-pipes so that the jets of steam shall strike the iron plate at an angle and be reflected backward and upward, so as to cross the stream of air more than once, and thus heat the air while mingling with it, and increase the draft through the opening *i* into the combustion-chamber. When the supply of air and steam through the heated chamber is properly regulated, it unites thoroughly with the carbonic oxide and other products of imperfect combustion evolved from the fuel, and produces a perfect combustion with a flame in contact with the surfaces of the boiler and flues. This chamber *f* also forms the guard to the perforated pipe *e*, so that the same will not be burned out by the fire. Perforations may be substituted for the narrow opening *i*, as represented in Figs. 4 and 5; or any suitable openings may be provided, and the supply of air may be regulated by a damper, if desired. The side of the chamber *f* next the fire is shown in Fig. 5 as corrugated and coated with fire clay and sand to resist the action of the heat.

In Fig. 3 I have represented the side next the fire as formed with lugs on the outside and with spikes projecting on the inside, the outer projections serving to hold on a coating of fire clay and sand, the inner projections aiding to heat the air and steam passing through the chamber before going to the fire, and to some extent decomposing the steam. If desired, a pipe containing water, perforated so as to eject fine jets, or in any equivalent manner, may be substituted for the perforated steam-pipes, the heat of the chamber converting the water instantly into steam.

The front plate of the chamber *f* (shown in Fig. 3) may be either straight or corrugated, and formed with lugs, as represented. It is obvious the forms of the different parts of these combinations may be changed in a great variety of ways and according to the construction of the furnaces of the boilers without changing the character of the invention.

The claim is not made, broadly, to the use of steam in the combustion-chamber, or to the admixture of steam and air in the combustion-chamber and upon the fuel for the purpose of increasing the combustion of the fuel, as their beneficial effect, when properly applied, has been long known, nor for the use of a separate air-flue or of perforated steam-pipes, as these devices have been used by prior inventors; but

What is claimed as the invention of said TIFFANY and HEERMANCE is as follows:

1. The combination of a chamber or flue for the heating and transmission of air into a furnace above the fuel, with a perforated pipe therein to transmit steam, mingled with the heated air, through said chamber, so as to supply an amount of steam and heated air mingled together for the purpose of consuming the products of imperfect combustion evolved from the fuel, substantially as described.

2. The method of combining and commingling the heated air and steam or the gases liberated by the decomposition of steam in the heated chamber aforesaid, by which the draft through the chamber is essentially increased, and the mingled air and steam or gases liberated as aforesaid are thoroughly intermixed with the inflammable gases and cinders which pass off from the fuel unconsumed, and thus cause their perfect combustion, substantially as set forth.

3. The combination of such heated chamber with its interior pipe, as described, with the furnace, at such part of the furnace as that the jet of heated air and steam or the gases liberated from the decomposition of steam may mingle with the unconsumed gases and cinders from the fuel, so that the flame arising from their combustion may come in contact with the surfaces of the boiler and flues, for the purpose and in the manner described.

4. The combination of a regulated supply of heated air and steam into the combustion-chamber, so as to effect a perfect combustion of the unconsumed gases and cinders from the fuel in the manner described.

5. The construction of the chamber *f*, as represented in Fig. 3, with the lugs and spikes, for the purposes and as set forth.

JOSEPH C. TIFFANY.

Witnesses:

B. H. STROTHER,

J. B. LOOMIS.